United States Patent
Bahali et al.

(10) Patent No.: US 9,639,269 B2
(45) Date of Patent: May 2, 2017

(54) COMPUTING DEVICE-SPECIFIC MEMORY MODULE

(71) Applicant: Lenovo Enterprise Solutions (Singapore) PTE. LTD., New Tech Park (SG)

(72) Inventors: Sumanta K. Bahali, Cary, NC (US); Sumeet Kochar, Cary, NC (US); John K. Langgood, Cary, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 81 days.

(21) Appl. No.: 14/740,880

(22) Filed: Jun. 16, 2015

(65) Prior Publication Data
US 2016/0371002 A1   Dec. 22, 2016

(51) Int. Cl.
*G06F 12/02* (2006.01)
*G06F 3/06* (2006.01)

(52) U.S. Cl.
CPC .......... *G06F 3/0604* (2013.01); *G06F 3/0632* (2013.01); *G06F 3/0659* (2013.01); *G06F 3/0673* (2013.01)

(58) Field of Classification Search
None
See application file for complete search history.

(56) References Cited

U.S. PATENT DOCUMENTS

2013/0238888 A1*  9/2013  Rosas ................... G06F 15/177
                                                         713/100

OTHER PUBLICATIONS

"Serial presence detect", Wikipedia entry, online <https://en.wikipedia.org/wiki/Serial_presence_detect?oldid=621205105>, Aug. 14, 2014, 15 pp.

* cited by examiner

*Primary Examiner* — Duc Doan
(74) *Attorney, Agent, or Firm* — Jason Friday (57) ABSTRACT

A memory module stores a computing device type-specific parameter for each of a number of different types of computing devices. When the memory module is installed within a computing device, the computing device reads the computing device type-specific parameter for the particular type of computing device, and configures itself to use the memory module according to this parameter. As different types of memory modules become available, they are tested against different types of computing devices to determine the computing device type-specific parameter with which they should be programmed for each type of computing device.

27 Claims, 4 Drawing Sheets

| INDICATION OF CD TYPE-SPECIFIC INFO STORAGE | | | |
|---|---|---|---|
| CD TYPE A | PROC TYPE A | MEM VOLT A | POR |
| CD TYPE A | PROC TYPE A | MEM VOLT B | POR |
| CD TYPE A | PROC TYPE B | MEM VOLT A | POR + 1 |
| CD TYPE A | PROC TYPE B | MEM VOLT B | POR + 2 |
| CD TYPE B | PROC TYPE A | MEM VOLT A | POR |
| CD TYPE B | PROC TYPE A | MEM VOLT B | POR + 1 |
| CD TYPE B | PROC TYPE B | MEM VOLT A | POR |
| CD TYPE B | PROC TYPE B | MEM VOLT B | POR + 2 |

COMPUTING DEVICE-SPECIFIC MEMORY MODULE

BACKGROUND

Computing devices, including desktop computers, laptop computers, and other types of computers and computing devices, use semiconductor random-access memory (RAM) to store information. The memory can volatile or non-volatile. Many types of computing devices have sockets that are receptive to installation of memory modules, such as dual in-line memory modules (DIMMs), of varying capacities. This permits the computing devices to be upgraded with different memory configurations later, such as to increase the amount of memory within a computing device, and also facilitates easy replacement of faulty memory.

SUMMARY

An example non-transitory computer-readable medium stores computer-executable code executable by a computing device to determine a type of the computing device. The code is executable by the computing device to determine whether a memory module installed within the computing device stores a computing device type-specific parameter. The code is executable by the computing device to, in response to determining that the memory module stores the computing device type-specific parameter, read the computing device type-specific parameter for the type of the computing device. The code is executable by the computing device to configure the computing device to use the memory module according to the computing device type-specific parameter that has been read.

An example method includes testing a memory module that is of a particular type of memory module against a computing device having a particular type to determine performance characteristics of the memory module when used within the computing device. The method includes determining a selected plan of record (POR) of a number of predetermined PORs that have already been established for the particular type of the computing device, based on the performance characteristics of the memory module that have been determined. The method includes programming memory modules that are of the particular type of memory module to specify the selected POR for the particular type of the computing device.

An example memory module includes a logic board, random-access memory (RAM) integrated circuits (ICs) mounted on the logic board, and a programmable read-only memory (PROM) mounted on the logic board. The PROM stores one or more predetermined values within one or more corresponding specific bytes to denote that the memory module stores computing device type-specific information. The PROM stores records that each store a computing device type-specific parameter for a particular type of computing device. The computing device type-specific parameter indicates to computing devices of the particular type how the computing devices are configurable to best use the memory module.

BRIEF DESCRIPTION OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, many types of computing devices have sockets that are receptive to installation of memory modules like dual in-line memory modules (DIMMs). Memory modules have standardized form factors and speeds. This permits memory modules to be sourced from different manufacturer or vendors for utilization within a given computing device, so long as the memory modules conform to a form factor and speed with which the computing device is compatible. For example, PC3200 double data rate (DDR) synchronous dynamic random-access memory (SDRAM) is designed to operate at 200 megahertz (MHz) with a bandwidth of 3,200 megabytes per second (MBs) on both rising and falling clock cycles. Regardless of the manufacturer or vendor and regardless of the version (i.e., type) of a PC3200 DIMM, a compatible computing device can configure itself to use the DIMM at these specifications.

However, for a given type of computing device, it can be determined that memory modules that otherwise conform to the same form factor and speed can provide for different performance by manufacturer or vendor, or even by version from the same manufacturer/vendor. For a computing device to take advantage of the better performance that a given manufacturer's memory modules or that a given version of memory module from a particular manufacturer can provide, though, conventionally the computing device has to identify the memory module by manufacturer and/or by version, and also know how to specify memory settings to leverage the better performance the module can provide. For example, it may be determined after testing that a certain version of PC3200 DIMM made by a certain vendor can operate within a given type of computing device at performance levels greater than the PC3200 standard otherwise proffers.

In actuality, this means that the computing device has to be preprogrammed with a large inventory of existing memory modules and the memory settings for each memory module. However, once the system software for a computing device has been released, the system software has to have its memory module inventory updated to take advantage of new memory modules. For example, the system software upon release may know that version A of a given kind of memory module from a particular vendor has certain performance characteristics, but version B of the same kind of memory module may be released after the system software was released.

Installing version B of this memory module into a computing device results in the system software configuring the computing device's memory settings for the lowest common denominator for the type of memory module in question. For example, if the memory module is a PC3200 DIMM, and if the system software otherwise has no information as to how to configure the computing device to leverage the better performance that version B can offer, the software would configure the device to use the memory module with the default settings for such PC3200 DIMMs. Although the system software can be later updated, many enterprises in particular are reluctant to upgrade software without extensive testing to ensure other problems do not arise.

Techniques disclosed herein overcome these drawbacks. A memory module has programmed therein a computing device type-specific parameter for each of a number of different types of computing devices. When the memory module is installed within a computing device, the device reads the parameter for its computing device type from the module, and configures itself to use the memory module according to this parameter.

Such techniques mean system software for a computing device does not have to be updated to take advantage of memory modules that have yet to be released or tested. For example, the system software can be preprogrammed to specify memory module settings for each of a corresponding number of different performance levels, or plans of record (PORs) for the computing device. When a new version of a memory module is released, testing of the memory module provides the maximum performance POR at which it can properly operate in a each of a number of different types of computing devices. These PORs are written to memory modules of this version. Thus, when such a memory module is installed within a computing device of a given type, the system software for the computing device reads the POR for its computing device type, and knows how to configure the memory module settings to maximally leverage the performance that the memory module can offer.

The system software for a computing device therefore does not have to have a large inventory of different manufacturers' memory modules and different versions of memory modules. Rather, the system software has preprogrammed a smaller set of performance levels, which can even include performance levels that no existing memory module can reach. Each version of each manufacturer's memory modules is tested against a number of different types of computing devices, and the corresponding memory modules programmed with the performance level at which it can reliably operate within computing devices of each type. The performance levels for the computing device types are specified in advance, and can differ on a per-computing device type basis. The system software does not have to identify the particular manufacturer or the particular version of memory module installed within a computing device, but just has to read the stored performance level from the memory module for the type of the computing device.

Figure 1:
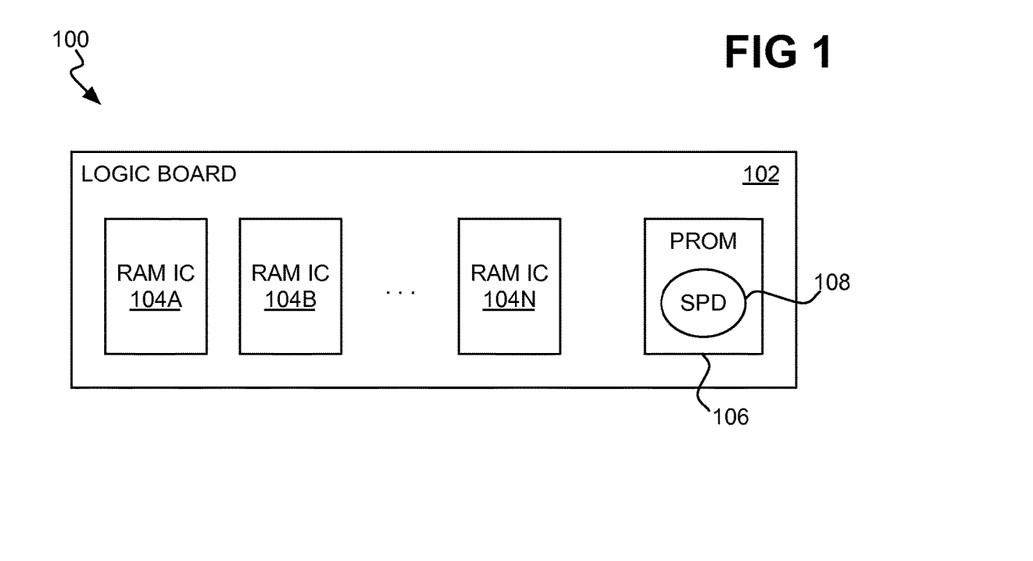
FIG. 1 is a diagram of an example memory module.

FIG. 1 shows an example memory module 100. The memory module 100 may be a DIMM, such as an SDRAM DIMM. The memory module 100 is removably installable within a corresponding socket of a computing device. The memory module 100 includes a logic board 102, and a number of RAM integrated circuits (ICs) 104A, 104B, . . . , 104N, collectively referred to as RAM ICs 104, mounted on the logic board 102. The RAM ICs 104 are the components of the memory module 100 that permit the module 100 to store data for the computing device in which it is installed. For example, a memory module 100 that has a capacity of thirty-two gigabytes (GB) is able to store thirty-two GB of data within the RAM ICs 104.

The memory module 100 includes a programmable read-only memory (PROM) 106 mounted on the logic board 102. The PROM 106 can be an electrically erasable PROM (EEPROM). The PROM 106 can store serial presence detect (SPD) information 108. The SPD information 108 is a standardized way by which a computing device access information about the memory module 100, such as the standard with which it is compatible, like PC3200, and so on.

Figure 2:
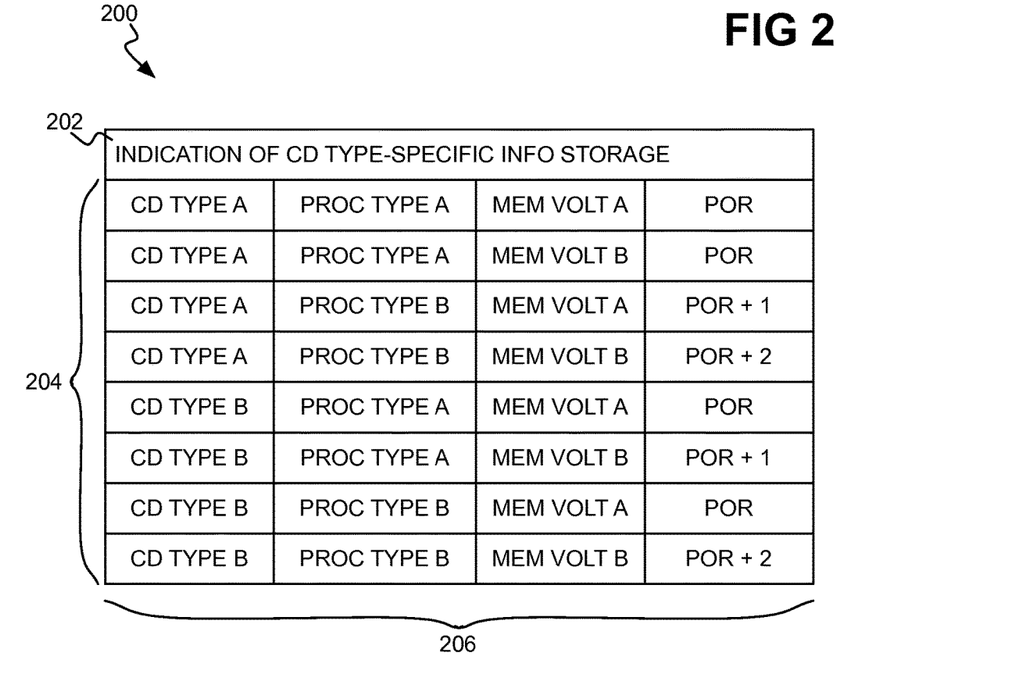
FIG. 2 is a diagram of example information stored by a memory module.

FIG. 2 shows data bytes 200 that the memory module 100 stores within the PROM 106 as well, and which can be included as a part of an augmentation of the SPD information 108 that the PROM 106 already stores. The bytes 200 include one or more predetermined values within one or more corresponding specific bytes that correspond to an indication 202 that the memory module 100 stores computing device type-specific information. The bytes 200 further include a number of records 204 within other corresponding specific bytes that store information for each of a number of different fields 206.

Each record 204 specifically stores a computing device type, and can also store a processor type or family and/or a memory voltage, as is the case in the example of FIG. 2. For the combination of computing device type, processor type, and memory voltage to which a record 204 of FIG. 2 corresponds, the record 204 stores a specific parameter, such as a plan of record (POR). A POR can be defined as a maximum frequency of memory that a particular memory controller chipset used in a computing device can support for a given family of processor and for the number of memory modules that are present in the device. A baseline POR is typically provided by the vendor of the memory controller chipset, and is generally conservative, such that other more aggressive (i.e., better performance) PORs may be specified.

The POR of a record 204 is the POR at which the memory module 100 is operable within a computing device of the corresponding type that has a processor of the corresponding type when the memory module 100 is driven at the corresponding memory voltage. This POR can be the POR of a computing device of the corresponding type having a processor of the corresponding type that provides the greatest proper performance of the computing device when the memory module 100 is driven at the corresponding memory voltage. That is, the POR can be the POR of a computing device of the corresponding type having a processor of the corresponding type at which the computing device can best use the memory module 100 when driving the module 100 at the corresponding memory voltage.

In the example of FIG. 2, for instance, when the memory module 100 is installed within a computing device of type A having a processor of type A, the computing device can operate at its baseline performance POR regardless of whether it is driving the module 100 at voltage A or B. When the memory module 100 is installed within a computing device of type A having a processor of type B, however, the computing device can operate at its higher performance POR+1 when driving the module 100 at voltage A, and at its even higher performance POR+2 when driving the module 100 at voltage B. When the memory module 100 is installed within a computing device of type B having a processor type A or B, the computing device can operate at its baseline performance POR when driving the module 100 at voltage A. When the memory module 100 is installed within a computing device of type B that is driving the module at voltage A or B, the computing device can operate at its higher performance POR+1 when its processor is of type A, and at its even higher performance POR+2 when its processor is of type B.

The PORs themselves are particular to computing device type. That is, the POR for computing device type A can differ from the POR for computing device type B. Similarly, the POR+1 and the POR+2 for computing device type A can differ from the POR+1 and the POR+2, respectively, for computing device type B. In general, the POR for a computing device type specifies at least the memory module settings at which computing devices of this type are to be configured when using a memory module 100.

The computing device type is an identifier of the type of computing device in which the memory module 100 is installable, and can be pre-specified by the manufacturer of the computing device. The identifier of the type of computing device can be unique to the combination of hardware of the computing device type, such as its memory controller, graphics hardware, and so on, apart from the processor type when the fields 206 include processor type. For example, a manufacturer or vendor may program the indication 202 of the memory module 100 to read its name, such as LENOVO, and then specify the computing device types as desired to correspond to different combinations of hardware of computing devices that the manufacturer makes and/or sells.

The processor type, when present, is an identifier of the type or family of a processor that can be installed within computing devices of a particular type—that is, with which such computing devices are compatible. For example, computing devices of a particular type may have sockets conforming to a given physical form factor that are receptive to different families of processor and/or different clock speeds of the same or different families of processor. The processor type may correspond to processor family regardless of clock speed, may correspond to processor clock speed regardless of processor family, or may correspond to a unique combination of a processor family at a particular clock speed.

The memory voltage, when present, is an identifier of the voltage at which computing devices of a particular type are able to drive the memory module 100. Some types of memory module 100, for instance, can be driven at a number of different voltages. The field 206 for memory voltage may indicate such voltages numerically, or by a reference corresponding to a particular voltage.

As noted above, in the example of FIG. 2, each record 204 corresponds to a unique combination of computing device type, processor type, and memory voltage. In another implementation, each record 204 may just correspond to computing device type. In still other implementations, each record 204 may just correspond to a unique combination of computing device type and processor type, or to a unique combination of computing device type and memory voltage. Most generally, each record 204 corresponds to at least computing device type, and can also correspond to a unique combination of computing device type and one or more other parameters, such as processor type, memory voltage, and so on.

Figure 3:
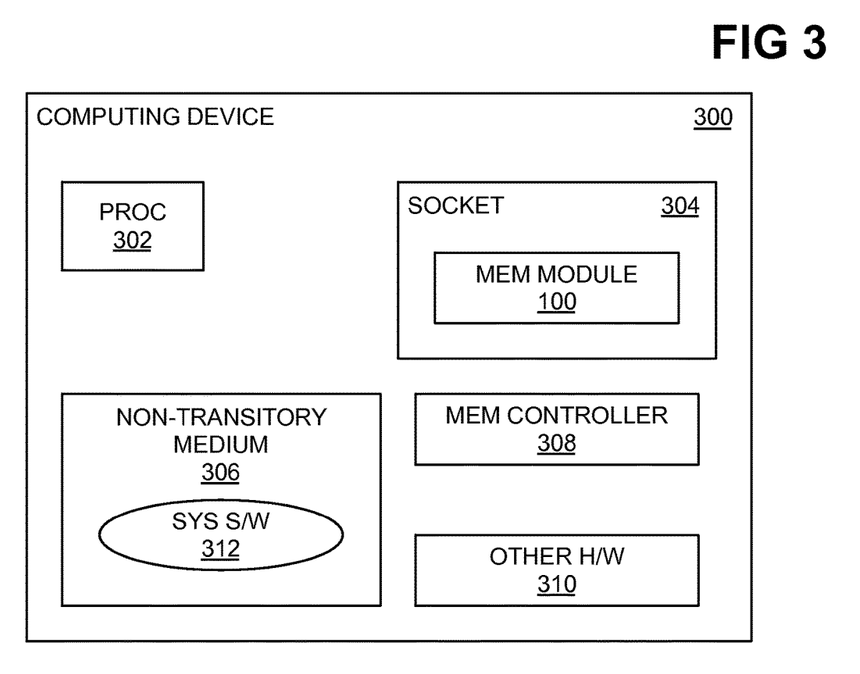
FIG. 3 is a diagram of an example computing device.

FIG. 3 shows an example computing device 300. The computing device 300 may be a desktop computer, a laptop computer, a server computer, or another type of computer or computing device. The computing device 300 includes a processor 302 and can include a memory socket 304 into which the memory module 100 is removably installable. The processor 302 itself may be removably installable within a corresponding processor socket of the computing device 300 as well. The computing device 300 further includes a non-transitory computer-readable medium 306, a memory controller 308 that controls the memory module 100, and other hardware 310, such as graphics hardware, storage devices, and so on.

The non-transitory medium 306 is non-volatile and stores system software 312. The system software 312 can be the firmware for the computing device 300, such as a basic input/output system (BIOS). The non-transitory medium 306 may be a ROM, an EPROM, or flash memory. The system software 312 can be software that operates at a lower level (like firmware) than other software installable on the computing device 300, such as an operating system, or can include the operating system in one implementation. The firmware operates the computing device 300 when first turned on, and boots the operating system of the computing device 300, typically after performing a power-on self-test (POST) operation. The system software 312 configures the computing device 300, such as the memory controller 308 thereof, to use the memory module 100 according to a computing device-type specific parameter of the memory module 100, such as a POR as has been described.

Figure 4:
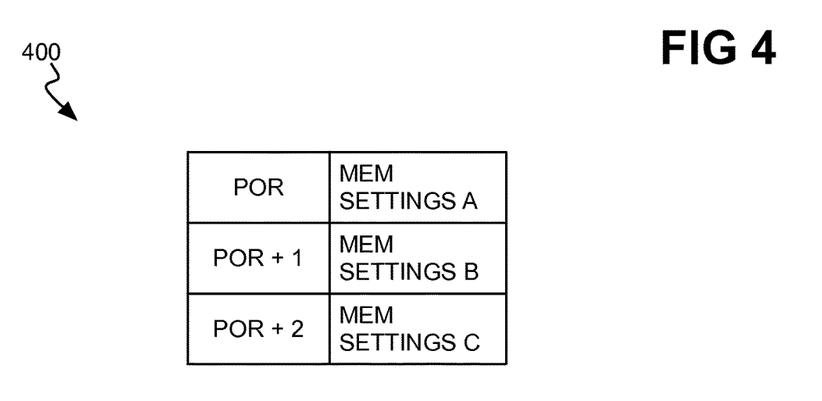
FIG. 4 is a diagram of example information stored by a computing device.

FIG. 4 shows information 400 that the system software 312 of the computing device 300 stores. For each of a number of different PORs, including a baseline POR, a higher performance POR+1, and an even higher performance POR+2 in the example of FIG. 4, the information 400 includes different memory module settings in accordance with which the computing device 300 is configurable. The system software 312 interrogates the memory module 100 to determine the record 204 corresponding to the computing device 300, retrieves the POR of this record 204, and configures the device 300 according to the POR that has been retrieved. The information 400 can further be specific to different processor types, memory voltages, and systems as well. For example, the information 400 can be different for a different combination of processor type, memory voltage, and system.

As noted above, a POR for one type of computing device can differ from the POR for another type of computing device. For example, the memory module settings for POR+1 for one type of computing device can be different than the memory module settings for POR+1 for another type of computing device. Furthermore, a given POR can be a "stretch goal" that specifies memory module settings for which no existing memory module is compatible. This permits future memory modules that may be compatible with the POR in question to be best used within the computing device 300 without having to first upgrade or update the system software 312.

Figure 5:
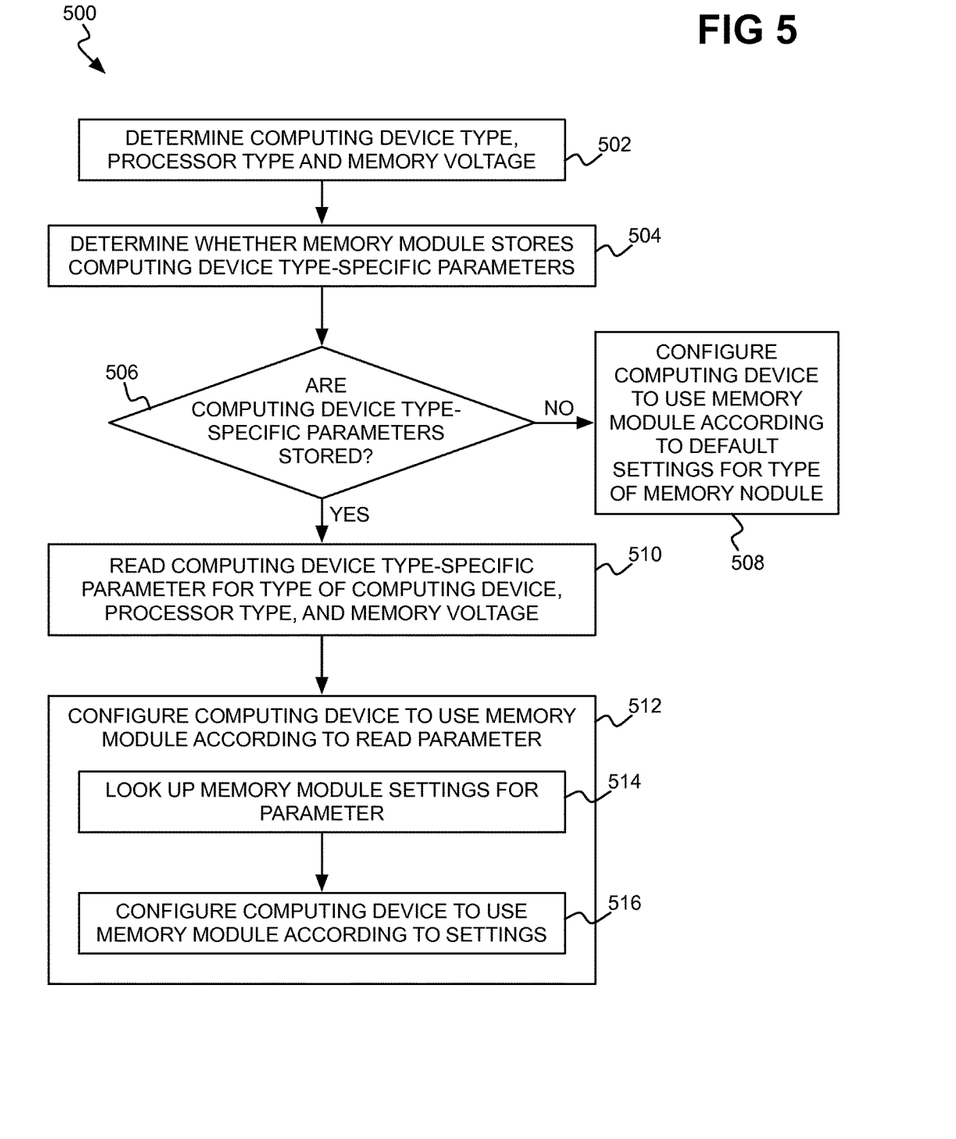
FIG. 5 is a flowchart of an example method for configuring a computing device to use a memory module.

FIG. 5 shows an example method 500 that the system software 312 of the computing device 300 performs to configure the memory module 100 installed within the device 300. The method 500 can be implemented as computer-executable code executed by the computing device 300. The method 500 is described in relation to the records 204 storing PORs for unique combinations of computing device type, processor type, and memory voltage. However, the method 500 can be generalized to specify PORs by computing device type, or by unique combinations of computing device type and one or more parameters such as processor type and/or memory voltage, and so on.

The method 500 includes determining the computing device type of the computing device 300, the processor type of the processor 302, and the memory voltage at which the device 300 can drive the memory module 100 (502). For example, this information may be stored within the system software 312 itself The method 500 includes determining whether the memory module 100 stores computing device type-specific parameters, such as PORs (504). Determining whether the memory module 100 stores computing device-type specific parameters can include determining whether one or more specific bytes 200 store predetermined values corresponding to the indication 202 that computing device type-specific information is stored within the module 100.

If the memory module 100 does not store such computing device type-specific parameters (506), then the method 500 proceeds to configure the computing device 300 to use the memory module 100 according to the default settings for the kind of the memory module 100 (508). For example, if the memory module 100 is a PC3200 DIMM, then the computing device 300 is configured to use the memory module 100 as such a DIMM in part 508. This ensures that if a non-computing device-specific memory module 100 has been installed within the computing device 300, then the computing device 300 can still use the memory module 100, albeit at performance levels that do not exceed the default associated with the kind of the module 100.

By comparison, if the memory module 100 stores computing device type-specific parameters (506), then the method 500 proceeds to read the computing device type-specific parameter for the unique combination of computing device type, processor type, and memory voltage that has been determined in part 502 (510). For example, each record 204 may be read until a selected record 204 matching the unique combination in question is found. It is noted that if no such matching record 204 is found, then the method 500 may again proceed to part 508, which is not depicted in FIG. 5 for illustrative clarity.

The computing device 300 is then configured to use the memory module 100 according to the computing device type parameter of the selected record 204 (512). Configuration can include looking up the memory module settings for the parameter within the information 400 stored by the system software 312 (514), and then configuring the computing device 300 according to these settings (516). In this way, the computing device 300 can leverage the memory module 100 at a computing device-type level, even if the device 300 has no knowledge of the manufacturer or vendor of the module 100, even if computing devices of other types cannot so leverage the module 100, and even if the module 100 was not available for sale or even testing when the system software 312 was released.

For example, the computing device 300 may have two PORs: a baseline POR and an improved-performance POR+1. At the time the system software 312 is released, memory module settings are specified for each POR. At that time, a certain vendor may be manufacturing a first revision, revision A, of a memory module 100 that is nominally compatible with the PC3200 standard and that is compatible just with the baseline POR of the type of the computing device 300.

After release of the system software 312, the vendor may manufacture a newer version, revision B, of the memory module 100 that is still nominally compatible with the PC3200 standard, but that is compatible with the improved-performance POR+1 of the computing device 300's type. Therefore, the computing device 300 can configure itself to use revision B of the memory module 100 according to the improved-performance POR+1, even though this memory is still considered PC3200 memory and was not even available for testing when the system software 312 was released. Further, a different type of computing device may be unable to use revision B at an improved-performance level, and other types of computing devices that do not practice the method 500 can still use the memory module 100 according to the PC3200 standard.

In one implementation, the computing device 300 can override the POR reported by the memory module 100. This may be because, for instance, the computing device 300 is constrained such that it cannot utilize this POR. For example, another memory module may report a different, lower POR, or the computing device 300 may be constrained in another manner.

Figure 6:
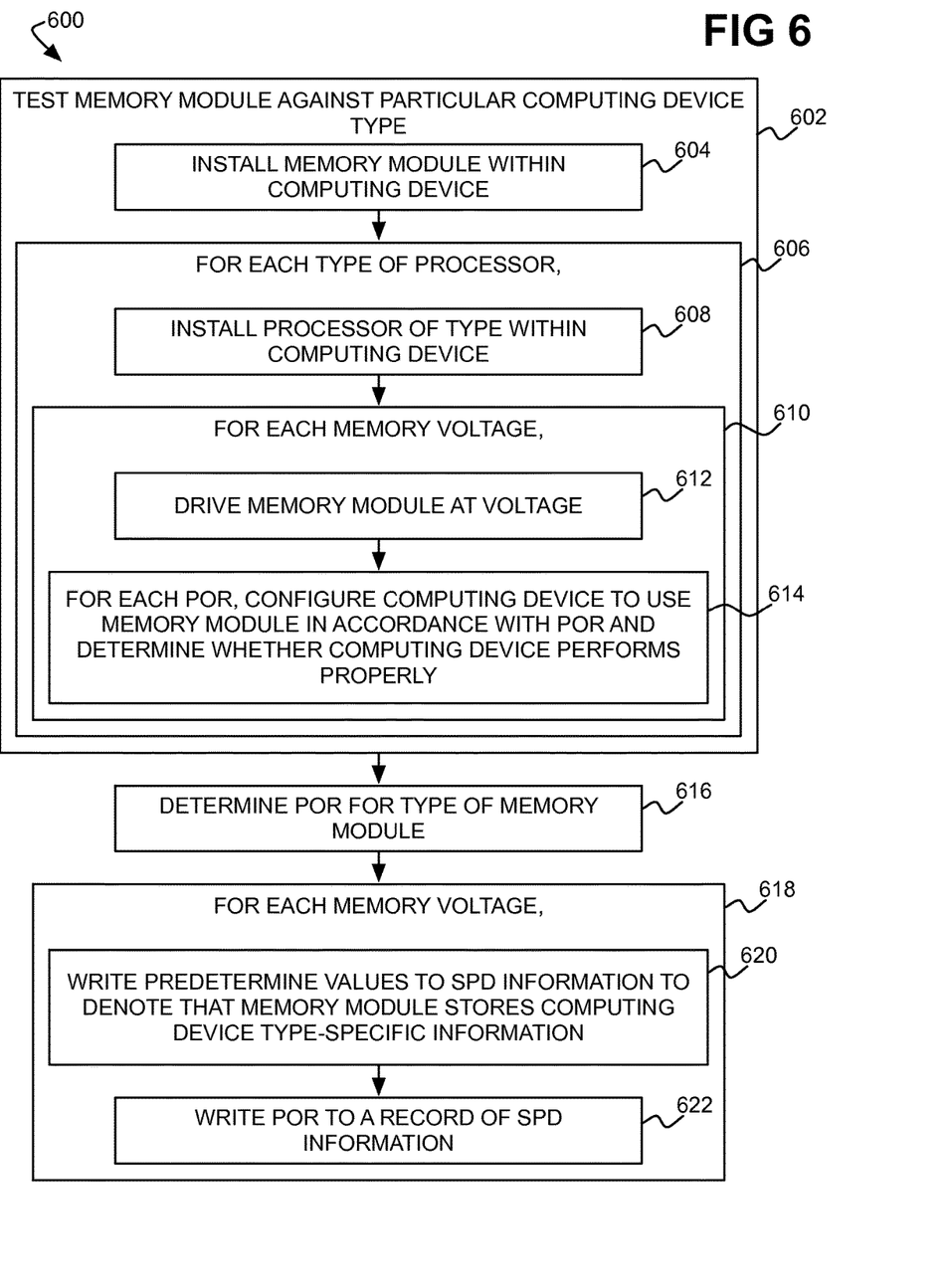
FIG. 6 is a flowchart of an example method for programming a memory module.

FIG. 6 shows an example method 600 for programming memory modules of the same memory module type (e.g., such as the same version) as the memory module 100. The method 600 may be performed in general at two times. First, the method 600 is typically performed when a new computing device type has been developed, in which case the method 600 is repeated for each memory module type for which it is desired to provide improved performance if possible for this new computing device type. Second, the method 600 is typically performed when a new type of a memory module 100 is available, in which case the method 600 is repeated for each computing device type for which it is desired to provide improved performance if possible for this new type of the memory module 100.

The method 600 is described in relation to a particular computing device type. The method 600 is further described in relation to the records 204 storing PORs for unique combinations of computing device type, processor type, and memory voltage. However, the method 600 can be generalized to specify PORs by just computing device type, or by unique combinations of computing device type and one or more parameters such as processor type and/or memory voltage, and so on.

The method 600 includes testing the memory module 100 against the computing device 300, which is of a particular computing device type (602). The memory module 100 is installed within the computing device 300 (604). The following is performed for each type of processor with which the computing device 300 is compatible as desired (606). A processor having the processor type in question is first installed within the computing device 300 (608).

Then, for each memory voltage at which the computing device 300 can drive the memory module 100 as desired, the following is performed (610). The memory module 100 is driven at the memory voltage in question (612). The computing device 300 is configured for each POR of its computing device type that has been previously established, and whether the computing device 300 performs properly at each POR is determined (614). For instance, part 614 can include measuring performance characteristics at each POR if the computing device 300 properly operates when so configured.

The POR for the type of memory module 100 is then determined for each unique combination of processor type and memory voltage for the type of computing device 300 (616). For example, for processor type A and memory voltage A, of three PORs including a baseline POR, a higher performance POR+1, and an even higher performance POR+2 for the computing device 300, the device 300 may not operate properly—i.e., satisfactorily or reliably—at either POR+1 or POR+2. As such, the POR for this combination can be specified as the baseline POR. As another example, for processor type B and memory voltage A, of the three PORs, the computing device 300 may operate properly at POR, operate properly with better performance at POR+1, and not operate properly at POR+2. Therefore, POR+1 is selected for this unique combination, as the POR that provides for the maximum compatible performance. That is, the POR for the type of memory module 100 may be selected as that which provides for the greatest proper performance of the type of the computing device 300.

Once PORs have been determined in part 616, memory modules of the same type (i.e., the same version) as the memory module 100 are programmed with this information (618). If the memory modules have not been previously programmed for computing device type-specific information, then the programming can include writing predetermined values to specific bytes 200 of the SPD information 108 to denote the indication 202 that such computing device type-specific information is present (620). The programming can further include writing the POR determined for each unique combination in part 616 to a corresponding record 204 of the SPD information 108 (622).

By performing the method 600, vendors or manufacturers of computing devices can validate memory modules that are nominally compatible with a given standard, such as PC3200, to certify such modules for improved performance depending on the specific types of the modules, such as versions thereof from the same or different manufacturers. Such certification is at a computing device type level. A new version of a memory module can be certified to operate at higher performance for one computing device type than for a different computing device type. Further, the computing devices themselves do not have to explicitly identify what version a given memory module is or its manufacturer; rather, so long as the memory modules store the specific bytes 200 that provide the indication 202 as has been described, the computing devices can look up the appropriate POR to employ by locating the appropriate record 204.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A non-transitory computer-readable medium storing computer-executable code executable by a computing device to:
   determine a type of the computing device;
   determine whether a memory module installed within the computing device stores a computing device type-specific parameter;
   in response to determining that the memory module stores the computing device type-specific parameter, read the computing device type-specific parameter for the type of the computing device; and
   configure the computing device to use the memory module according to the computing device type-specific parameter that has been read.

2. The non-transitory computer-readable medium of claim 1, wherein the computing device type-specific parameter for the type of the computing device comprises:
   a plan of record (POR) for the type of the computing device with which the memory module is operable,
   wherein the POR is a selected POR of a plurality of PORs that have been predetermined for the type of the computing device.

3. The non-transitory computer-readable medium of claim 2, wherein the computing device is to configure the computing device to use the memory module according to the computing device type-specific parameter that has been read by:
   looking up a plurality of memory module settings for the selected POR, the memory module settings specific to the type of the computing device for the selected POR; and
   configuring the computing device to use the memory module according to the memory module settings.

4. The non-transitory computer-readable medium of claim 1, wherein the computer-executable code is executable by the computing device to further:
   determine one or more of a processor type of a processor of the computing device and a memory voltage that the computing device provides to the memory module,
   wherein the computing device is to read the computing device type-specific parameter for a combination of the type of the computing device and the one or more of the processor type and the memory voltage.

5. The non-transitory computer-readable medium of claim 4, wherein the computing device parameter comprises:
   a plan of record (POR) for the combination of the type of the computing device and the one or more of the processor type and the memory voltage with which the memory module is operable,
   wherein the POR is a selected POR of a plurality of PORs that have been predetermined for the combination of the type of the computing device and the one or more of the processor type and the memory voltage.

6. The non-transitory computer-readable medium of claim 5, wherein the computing device is to configure the computing device to use the memory module according to the computing device type-specific parameter that has been read by:
   looking up a plurality of memory module settings for the selected POR, the memory module settings specific to the combination of the type of the computing device and the one or more of the processor type and the memory voltage for the selected POR; and
   configuring the computing device to use the memory module according to the memory module settings.

7. The non-transitory computer-readable medium of claim 1, wherein the memory module is a dual-inline memory module (DIMM) having a programmable read-only memory (PROM) storing serial presence detect (SPD) information,
   wherein the computing device is to determine whether the memory module stores the computing device type-specific parameter by:
      determining whether one or more specific bytes of the SPD information store one or more corresponding predetermined values,
   and wherein the computing device is to read the computing device type-specific parameter for the type of the computing device by:
      reading each of a plurality of records of the SPED information until a selected record matching the computing device type-specific parameter for the type of the computing device is located.

8. A method comprising:
   testing a memory module that is of a particular type of memory module against a computing device having a particular type to determine performance characteristics of the memory module when used within the computing device;

determining a selected plan of record (POR) of a plurality of predetermined PORs that have already been established for the particular type of the computing device, based on the performance characteristics of the memory module that have been determined; and programming a plurality of memory modules that are of the particular type of memory module to specify the selected POR for the particular type of the computing device.

9. The method of claim 8, wherein testing the memory module against the computing device comprises:
installing the memory module within the computing device;
for each predetermined POR:
configuring the computing device to use the memory module according memory module settings specific to the predetermined POR; and
determining whether the computing device performs properly when configured to use the memory module according to the memory module settings specific to the predetermined POR.

10. The method of claim 9, wherein determining the selected POR comprises:
selecting the predetermined POR having the memory module settings that yield greatest proper performance of the computing device when the computing device is configured to use the memory module according to the memory module settings specific to the predetermined POR.

11. The method of claim 8, wherein testing the memory module against the computing device comprises:
installing the memory module within the computing device;
for each processor type of a plurality of processor types with which the computing device is compatible:
installing a processor of the processor type within the computing device;
for each predetermined POR:
configuring the computing device to use the memory module according memory module settings specific to the predetermined POR and to the processor type; and
determining whether the computing device performs properly when configured to use the memory module according to the memory module settings specific to the predetermined POR and to the processor type.

12. The method of claim 11, wherein determining the selected POR comprises, for each processor type:
selecting the predetermined POR having the memory module settings that yield greatest proper performance of the computing device when the computing device is configured to use the memory module according to the memory module settings specific to the predetermined POR and to the processor type,
and wherein programming the memory modules that are of the particular type of memory comprises, for each processor type:
programming the memory modules to specify the selected POR for a combination of the particular type of the computing device and the processor type.

13. The method of claim 8, wherein testing the memory module against the computing device comprises:
installing the memory module within the computing device;
for each memory voltage of a plurality of memory voltages at which the computing device is able to operate the memory module:
operating the memory module at the memory voltage;
for each predetermined POR:
configuring the computing device to use the memory module according memory module settings specific to the predetermined POR and to the memory voltage; and
determining whether the computing device performs properly when configured to use the memory module according to the memory module settings specific to the predetermined POR and to the memory voltage.

14. The method of claim 13, wherein determining the selected POR comprises, for each memory voltage:
selecting the predetermined POR having the memory module settings that yield greatest proper performance of the computing device when the computing device is configured to use the memory module according to the memory module settings specific to the predetermined POR and to the memory voltage,
and wherein programming the memory modules that are of the particular type of memory comprises, for each memory voltage:
programming the memory modules to specify the selected POR for a combination of the particular type of the computing device and the memory voltage.

15. The method of claim 8, wherein the particular type of memory module comprises a given type of dual-inline memory module (DIMM) manufactured by a particular vendor of a plurality of different vendors,
and wherein programming the memory modules that are of the particular type of memory module comprises:
writing one or more predetermined values to one or more corresponding specific bytes of serial presence detect (SPD) information within a programmable read-only memory (PROM) of the DIMM to denote that the memory module stores computing device type-specific information;
writing the selected POR for the particular type of the computing device within a record of the SPD information within the PROM of the DIMM corresponding to the particular type of the computing device.

16. A memory module comprising:
a logic board;
a plurality of random-access memory (RAM) integrated circuits (ICs) mounted on the logic board; and
a programmable read-only memory (PROM) mounted on the logic board and storing:
one or more predetermined values within one or more corresponding specific bytes to denote that the memory module stores computing device type-specific information; and
a plurality of records, each record storing a computing device type-specific parameter for a particular type of computing device, the computing device type-specific parameter indicating to computing devices of the particular type how the computing devices are configurable to best use the memory module.

17. The memory module of claim 16, wherein each computing device type-specific parameter comprises:
a plan of record (POR) for the particular type of computing device,
wherein each POR is a selected POR of a plurality of PORs that have been predetermined for the particular type of computing device.

18. The memory module of claim 17, wherein each record stores the computing device type specific parameter for a combination of the particular type of computing device and a particular processor type with which the computing devices of the particular type are compatible.

19. The memory module of claim 18, wherein each record stores the computing device type specific parameter for a combination of the particular type of computing device, the particular processor type, and a particular memory voltage at which the computing devices of the particular type are able to operate the memory module.

20. The memory module of claim 16, wherein the memory module is a dual-inline memory module (DIMM), and the PROM is an electronically erasable PROM (EEPROM) storing serial presence detect (SPD) information including the predetermined values and the records.

21. A computing device comprising:
  a processor;
  a memory controller;
  a socket receptive to which a memory module has been removably installed;
  a non-transitory computer-readable medium storing computer-executable code that the processor executes to:
    determine a type of the computing device;
    determine whether the memory module installed within the socket stores a computing device type-specific parameter;
    in response to determining that the memory module stores the computing device type-specific parameter, read the computing device type-specific parameter for the type of the computing device; and
    configure the memory controller to use the memory module according to the computing device type-specific parameter that has been read.

22. The computing device of claim 21, wherein the computing device type-specific parameter for the type of the computing device comprises:
  a plan of record (POR) for the type of the computing device with which the memory module is operable,
  wherein the POR is a selected POR of a plurality of PORs that have been predetermined for the type of the computing device.

23. The computing device of claim 22, wherein the processor is to execute the computer-executable code to configure the memory controller to use the memory module according to the computing device type-specific parameter that has been read by:
  looking up a plurality of memory module settings for the selected POR, the memory module settings specific to the type of the computing device for the selected POR; and
  configuring the memory controller to use the memory module according to the memory module settings.

24. The computing device of claim 21, wherein the processor is to execute the computer-executable code to further:
  determine one or more of a processor type of the processor and a memory voltage that the memory controller provides to the memory module,
  wherein the processor is to execute the computer-executable code to read the computing device type-specific parameter for a combination of the type of the computing device and the one or more of the processor type and the memory voltage.

25. The computing device of claim 24, wherein the computing device parameter comprises:
  a plan of record (POR) for the combination of the type of the computing device and the one or more of the processor type and the memory voltage with which the memory module is operable,
  wherein the POR is a selected POR of a plurality of PORs that have been predetermined for the combination of the type of the computing device and the one or more of the processor type and the memory voltage.

26. The computing device of claim 25, wherein the processor is to execute the computer-executable code to configure the computing device to use the memory module according to the computing device type-specific parameter that has been read by:
  looking up a plurality of memory module settings for the selected POR, the memory module settings specific to the combination of the type of the computing device and the one or more of the processor type and the memory voltage for the selected POR; and
  configuring the memory controller to use the memory module according to the memory module settings.

27. The computing device of claim 21, wherein the memory module is a dual-inline memory module (DIMM) having a programmable read-only memory (PROM) storing serial presence detect (SPD) information,
  wherein the processor is to execute the computer-executable code to determine whether the memory module stores the computing device type-specific parameter by:
    determining whether one or more specific bytes of the SPD information store one or more corresponding predetermined values,
  and wherein the processor is to execute the computer-executable code to read the computing device type-specific parameter for the type of the computing device by:
    reading each of a plurality of records of the SPED information until a selected record matching the computing device type-specific parameter for the type of the computing device is located.

* * * * *